United States Patent [19]

Schauer et al.

[11] Patent Number: 5,519,821

[45] Date of Patent: May 21, 1996

[54] SYSTEM AND METHOD FOR PRODUCING CONTOUR LINES FROM A NUMBER OF SAMPLE POINTS BY COMPARING CONTOUR HEIGHT WITH MEAN HEIGHT OF SURROUNDING SAMPLE POINTS

[75] Inventors: Ulrich Schauer, Sinsheim; Dieter Lattermann, Walldorf, both of Germany

[73] Assignee: International Business Machines Corporation, Armonk, N.Y.

[21] Appl. No.: 90,849

[22] Filed: Jul. 12, 1993

[30] Foreign Application Priority Data

Nov. 7, 1992 [EP] European Pat. Off. ............... 92111832

[51] Int. Cl.$^6$ ................................................ G06T 9/20
[52] U.S. Cl. ........................................ 395/142; 395/119
[58] Field of Search ................................ 395/119, 122, 395/127, 141, 140, 142; 382/60, 56; 364/474.29

[56] References Cited

U.S. PATENT DOCUMENTS

| | | | |
|---|---|---|---|
| 3,771,168 | 11/1973 | Beach et al. | 395/142 X |
| 4,829,456 | 5/1989 | Joonishi et al. | 395/142 X |
| 4,893,251 | 1/1990 | Seki et al. | 364/474.29 |
| 4,999,789 | 3/1991 | Fiasconaro | 395/127 |
| 5,182,795 | 1/1993 | Boutaud et al. | 395/142 |
| 5,239,591 | 8/1993 | Ranganath | 395/142 |
| 5,253,336 | 10/1993 | Yamada | 395/142 |
| 5,257,355 | 10/1993 | Akamatsu | 395/142 |
| 5,282,140 | 1/1994 | Tazawa et al. | 364/468 |
| 5,317,682 | 5/1994 | Luken, Jr. | 395/142 |
| 5,333,248 | 7/1994 | Christensen | 395/142 |
| 5,337,404 | 8/1994 | Baudelaire et al. | 395/141 |
| 5,414,802 | 5/1995 | Takamura | 395/119 |

OTHER PUBLICATIONS

EPO Search Report.
IEEE Trans. on Systems, Man, and Cybernetics, Jul. 1975, Johnston EG et al.
Morphological Decompostion of Natural Surfaces, SPIE vol. 1610, Curves and Surfaces in Computer Vision & Graphics II (1991), Falcidieno B et al.
Bronshtein et al., Handbook of Mathematics, 1985, pp. 206–214.
Srinivasan et al., Computational Geometric Methods in Columetric Intersection for #D Reconstruction Robotics and Automation, 1989 IEEE Intl Conf, 1989, pp. 190–195.
Tanaka et al., On Surface Curvature Computation from Level Set Contours, Pattern Recognition, 1990 10th Intl Conf, 1990, pp. 155–160.
Ulupinar et al., Shape from Controu:Straight Homogeneous Generalized Cones, Computer Vision, 1990 Conference, 1990, pp. 582–586.
Negahdaripour, Multiple Interpretations of the Shape and Motion of Objects from Two Perspective Images, 1990, pp. 1025–1039.
Tan et al., Bi–quadratic B–Spline Surfaces Generated from Arbitrary Polyhedral Meshes: A Constructive Approch, Computer Cision, Graphics and Image Processing, vol. 39, No. 2, 1987, pp. 144–166.
Purcell, Calculus with Analytic Geometry, 1965, pp. 556–563.

*Primary Examiner*—Mark K. Zimmerman
*Assistant Examiner*—Anton W. Fetting
*Attorney, Agent, or Firm*—Mark S. Walker

[57] ABSTRACT

A computer system is described for producing and representing contour lines of a saddle surface. The contour lines are obtained by a plane intersecting the saddle surface. Depending upon whether the intersecting plane is positioned above or below a saddle point of the saddle surface, two different contour lines result. By means of the height of the saddle point, the computer system is able to decide which of the possible contour lines are the correct ones for the particular case. The contour lines are determined in the form of two intersections, with intersections belonging together being stored in pairs in the computer system. By rearranging, exchanging, concatenating, etc. these intersection pairs, neighbourhood data is obtained defining the neighbour associated with each intersection. By means of this neighbourhood data the computer system is able to represent the polygons made up of contour lines on, say, an image screen.

3 Claims, 8 Drawing Sheets

SYSTEM AND METHOD FOR PRODUCING CONTOUR LINES FROM A NUMBER OF SAMPLE POINTS BY COMPARING CONTOUR HEIGHT WITH MEAN HEIGHT OF SURROUNDING SAMPLE POINTS

BACKGROUND OF THE INVENTION

1. Field of the Invention

The invention relates to a method for digitally producing contour lines from height points above a polygon net.

2. Background and Related Art

Methods of this type are carried out, for example, by a computer system for the purpose of image processing. The aim of the method is to calculate, in the case of an uneven surface formed by the height points, the lines of the same height and display them, for example, on an image screen. This is comparable to a geographic map on which the lines of the same height are drawn for a landscape consisting of mountains and valleys.

When calculating contour lines of this type, a particular problem arises with so-called saddle surfaces, which are produced, for example, by a square sheet of paper being bent up at two mutually diagonal corners and bent down at the other two diagonal corners. A so-called saddle point, which is uninfluenced by the bends, remains approximately in the centre of the paper.

To produce contour lines, it is necessary for a plane of the desired height to intersect the saddle surface. If this intersecting plane is situated above the saddle point, the bent-up corners of the paper are intersected. If, however, the intersecting plane is situated below the saddle point, the bent-down corners of the paper are intersected. Completely different contour lines are obtained depending upon whether the bent-up or the bent-down corners of the paper are intersected. In the present example, the contour lines assigned to the bent-up corners are arranged approximately at right angles to the contour lines assigned to the bent-down corners.

Because of the enormous computation work involved, inter alia, a computer system does not normally calculate the entire contour lines of the saddle surface. Instead, the computer system calculates the intersections of the connecting lines, limiting the saddle surface, with the desired intersecting plane. This calculation results in four intersections, of which in each case two neighbouring intersections must be connected to form a contour line. The contour lines are obtained above the saddle point in the case of one intersecting surface and below the saddle point in the case of one intersecting surface, depending upon which neighbouring intersections are interconnected.

The decision as to which of the possible contour lines are the correct ones in the particular case is usually made by means of so-called path-tracing algorithms, in which the computer system considers the polygons made up of the individual contour lines as a whole. It has emerged that path-tracing algorithms of this type are not error-free and that changes in the polygon net on which the entire calculations are based also lead to errors.

SUMMARY OF THE INVENTION

The object of the invention is to improve the method mentioned at the outset such that freedom from errors is ensured in every case.

This object is achieved according to the invention by calculating the height of the saddle point as the mean value of the heights of the height points making up the saddle surface. This height of the saddle point is then compared with one of the heights of the height points and with the desired height of the intersecting surface. If the height of the intersecting plane is situated between the height of the saddle point and the height of the one height point, the associated contour line is determined by the fact that it must intersect the connecting line of the saddle point and the one height point.

Using the height, defined as a mean value, of the saddle point, a decision criterion is provided by means of which the computer system is able to determine the correct contour lines in every case. If, namely, the height of the desired intersecting plane is not situated between the height of the saddle point and the height of the one height point, a contour line which should have the desired height at every point does not intersect the connecting line of the saddle point and the one height point.

The computer system is thus able to decide, correctly in every case, which are the correct contour lines solely on the basis of the data of the relevant saddle surface, without the use of a path-tracing algorithm or the like. This restriction to a single saddle surface has the additional advantage that changes in the polygon net on which the entire calculations are based do not result in any errors either.

After the computer system has determined the correct contour lines, it is able to calculate, in one embodiment of the invention, the intersection of the connecting line of the saddle point and the one height point with the desired intersecting plane. In this case it is expedient to represent the contour line as a straight line between the two neighbouring intersections calculated initially and the further intersection calculated now.

In a further embodiment of the invention, for each of the initially specified intersections, the two neighbouring intersections are calculated. Starting from the pairs of intersections which belong together because of the contour lines connecting them, the neighbouring intersections are established by means of rearranging measures.

The entire polygons can then be expediently produced simply by putting together the individual contour lines, the sequence of the individual contour lines being determined by the respective neighbouring intersections.

As a result of these last-mentioned measures, a considerable reduction in the amount of data to be stored, and also to be output to the image screen for example, is achieved. At the same time, by virtue of these measures it is no longer necessary to employ path-tracing algorithms or the like to form the polygons. This results in a considerable reduction in the computing time required.

BRIEF DESCRIPTION OF THE DRAWING

Further embodiments and advantages of the invention will become apparent from the following description of exemplary embodiments which are illustrated in the drawings, wherein.

DETAILED DESCRIPTION OF THE PREFERRED EMBODIMENT

A computer system for image processing includes, apart from the actual processor, inter alia, one or more memories and a data output device, for example an image screen. The memory is provided to store the data relating to the image points of an image, while the data output device is provided to give a visual representation of these image data to a user as a complete image.

Figure 1:
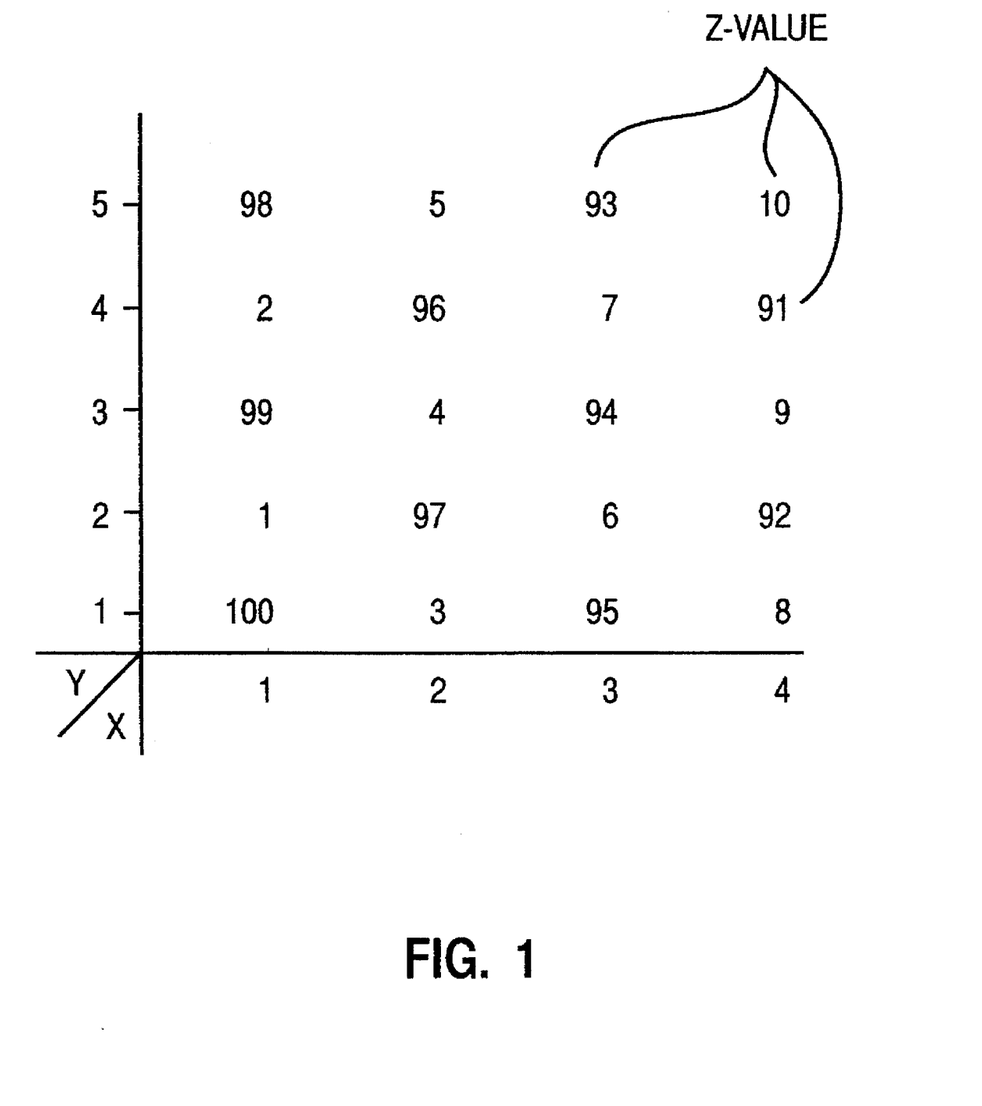
FIG. 1 shows a table of the z values of height points above an x, y rectangle net.

The table shown in FIG. 1 is stored in the memory of the computer system. Said table represents an x, y rectangle net in which the z values at the intersections of the net are entered. An x, y value pair, together with an associated z value, in each case gives a height point. The respective values in the table of FIG. 1 are chosen here for the purposes of the present example.

Figure 2:
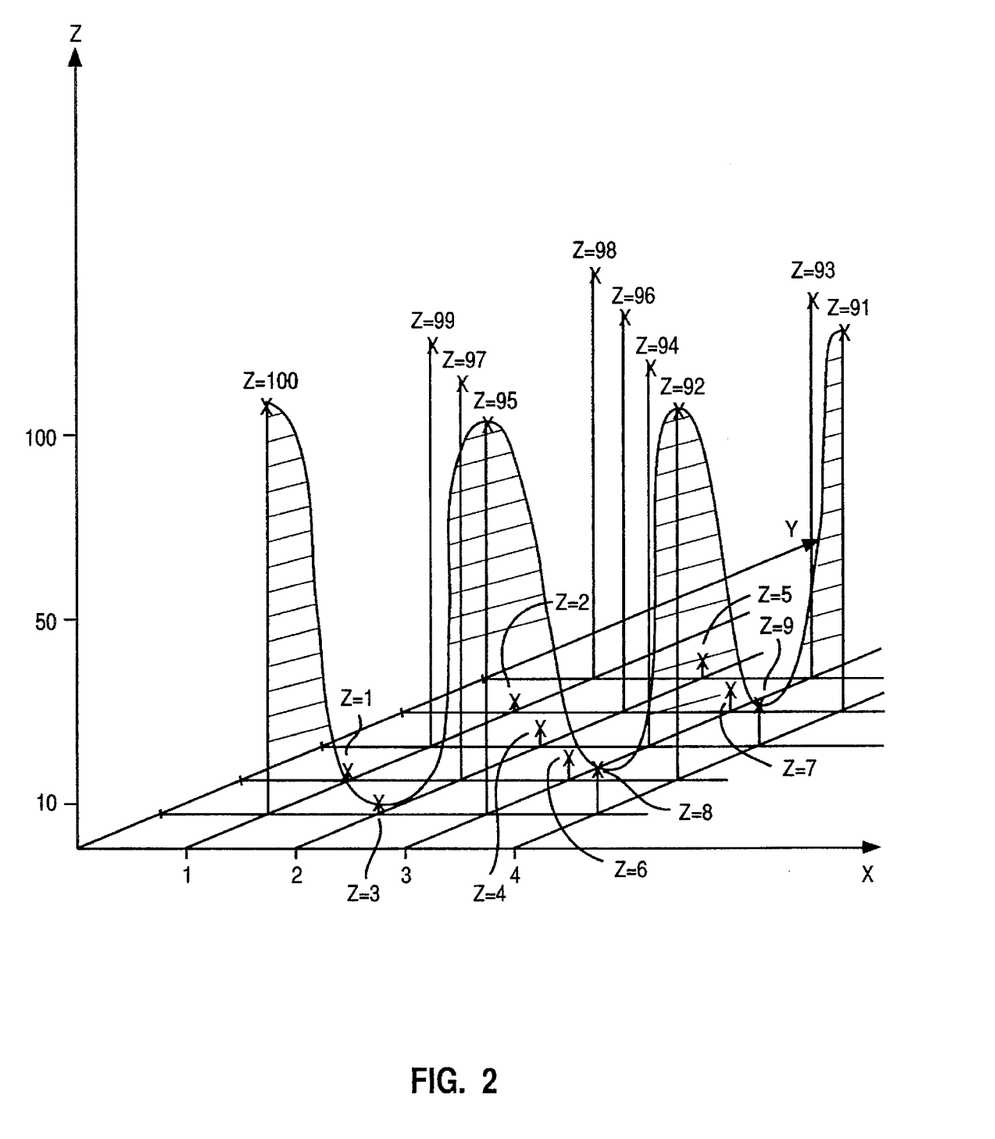
FIG. 2 shows a representation of the height points of FIG. 1 in a three-dimensional x, y, z coordinate system.

In FIG. 2 a three-dimensional x, y, z coordinate system is shown, in which the height points from the table of FIG. 1 are entered. If these height points are interconnected in all directions, a wave-shaped surface results therefrom, as indicated schematically in FIG. 2. This surface is comparable to the surface of a landscape consisting of mountains and valleys, where the height points can be the highest points of the mountains or the lowest points of the valleys.

Figure 3:
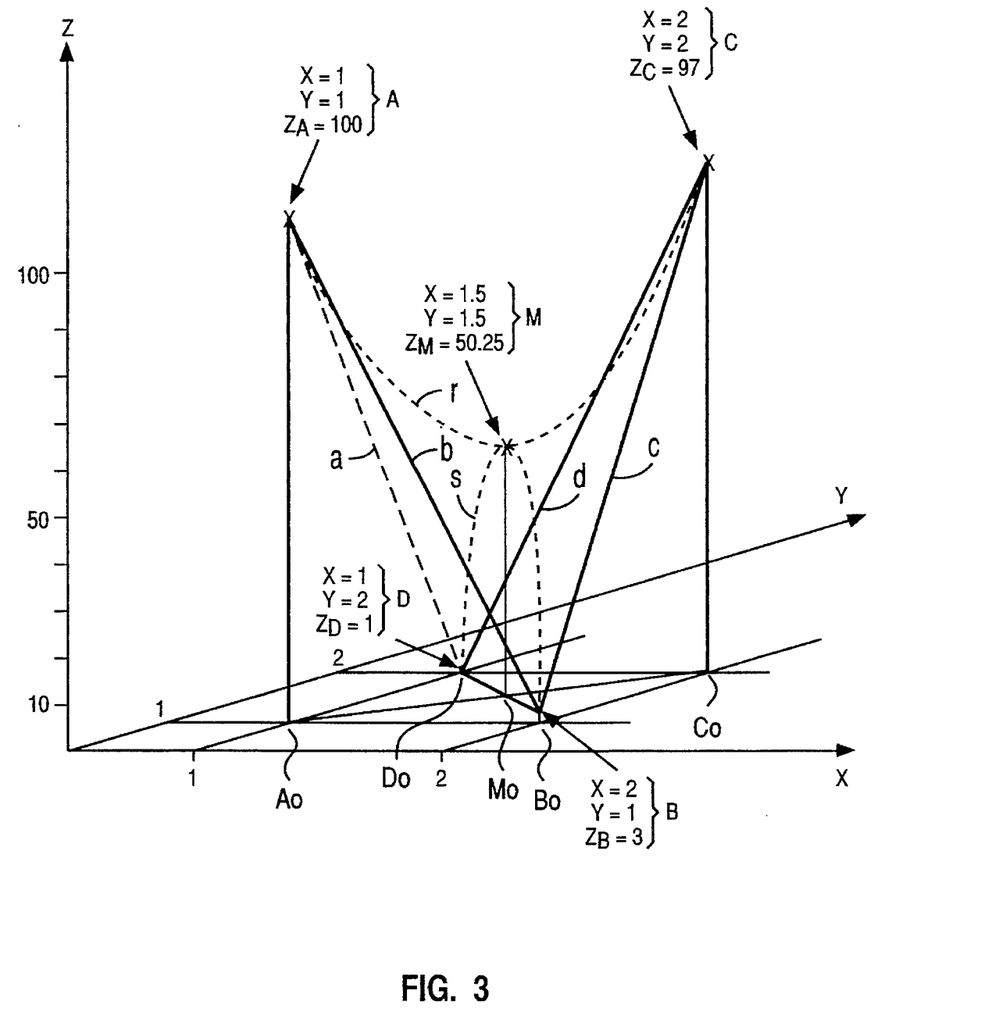
FIG. 3 shows a detail of the coordinate system of FIG. 2 with a saddle surface made up of four height points.

In FIG. 3 four height points are selected from the table of FIG. 1 or the three-dimensional representation of FIG. 2. The four height points are positioned above one mesh of the rectangle net and have the following denotations and coordinates:

$A(x=1, y=1, z_A=100)$;

$B(x=2, y=1, z_B=3)$;

$C(x=2, y=2, z_C=97)$;

$D(x=1, y=2, z_D=1)$;

The mesh of the rectangle net forming the base has the following denotations and coordinates:

$A_0(x=1, y=1)$;

$B_0(x=2, y=1)$;

$C_0(x=2, y=2)$;

$D_0(x=1, y=2)$.

The connecting lines between the height points A, B, C and D are denoted as follows:
A-B with b; B-C with c; C-D with d; D-A with a.

If the four height points A, B, C and D are interconnected in all directions, a saddle surface results. This is illustrated in FIG. 3 by means of the dotted lines r and s, where r represents the connecting line between the height points A and C and s represents the connecting line between the height points B and D. Owing to the choice of the z coordinates of the height points A, B, C and D, it is possible to imagine the saddle surface illustrated in FIG. 3 as a square sheet of paper of which two mutually diagonally arranged corners are bent up and the other two diagonal corners are bent down. The bent-up corners represent the height points A and C and the bent-down corners represent the height points B and D.

Situated approximately in the center of the square sheet of paper is a saddle point M which remains uninfluenced by the bends.

Since the table of FIG. 1 contains only the height points A, B, C and D, all the other points of the saddle surface illustrated in FIG. 3, and thus in particular also the saddle point M, depend upon the method of calculation by the computer system.

According to the invention, the saddle point M is located above the center $M_0$ of the mesh $A_0$, $B_0$, $C_0$ and $D_0$ of the rectangle net forming the base of the saddle surface. In the present example, this center has the following coordinates:

$M_0(x=1.5, y=1.5)$.

Furthermore, according to the invention the $z_M$ value, that is the height of the saddle point M above the rectangle net, is determined as the mean value of the z values, that is of the heights of the height points A, B, C and D of the saddle surface. The mean value of the z values of the height points A, B, C and D is in the present example $(100+3+97+1) \div 4 = 50.25$.

The saddle point M of FIG. 3 thus has the following coordinates:

$M(x=1.5, y=1.5, z_M=50.25)$.

The determination, according to the invention, of the $z_M$ value of the saddle point M as the mean value of the z values of the height points of the saddle surface is, per se, arbitrary. It has been shown, however, that this determination corresponds most closely to the natural conditions. If, for example, the connecting lines a, b, c and d of the height points A, B, C and D were constructed as a wire model, and if it were attempted to produce the saddle surface thereby defined, for example by means of a soap bubble or the like between the wires, a saddle surface of the smallest area would be obtained. In the three-dimensional coordinate system of FIG. 3, this "natural" saddle surface would have a saddle point substantially corresponding to the saddle point determined according to the invention.

It is however also possible for other values to be chosen as the z value of the saddle point M. This then results in the associated saddle surfaces in each case being shaped differently. These different saddle surfaces are, however, also based on the values given in the table of FIG. 1, so that in this respect they are not incorrect but at most "less natural".

The method of calculating the $z_M$ value of the saddle point M is only of secondary importance in the following solution to the problem of correctly determining contour lines in saddle surfaces; what is essential is that such a $z_M$ value of the saddle point M is present in some form.

Figure 4A:
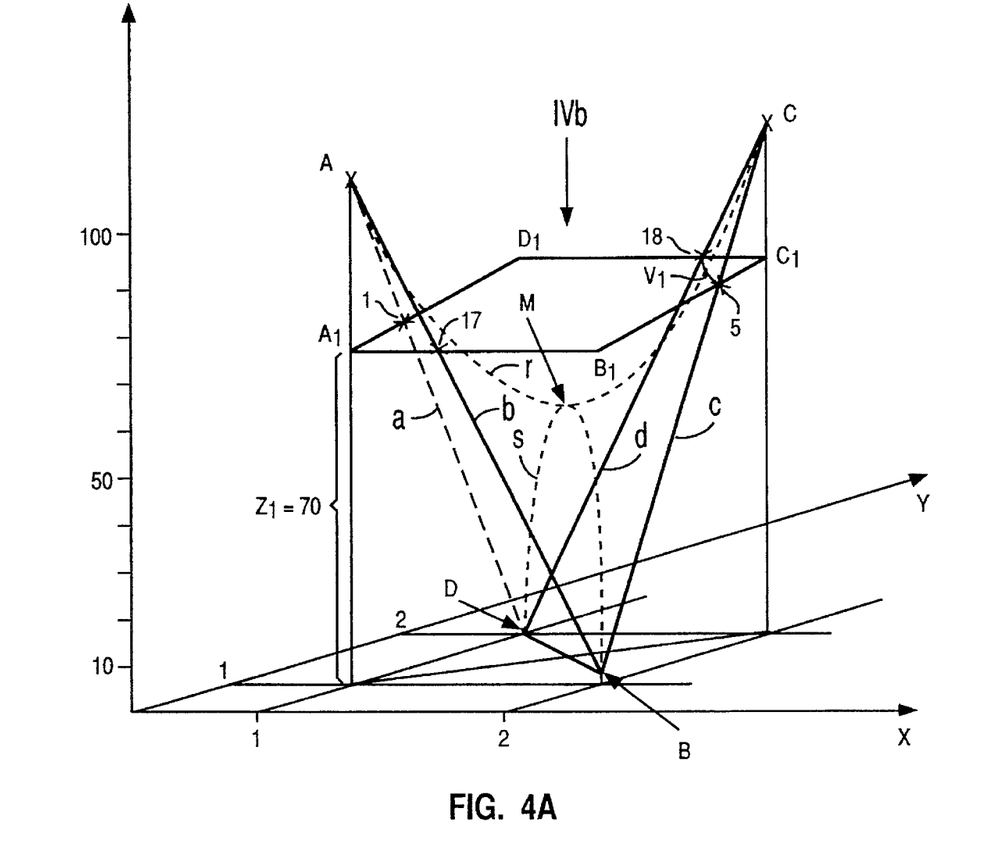
FIGS. 4e and 4b show the saddle surface of FIG. 3 with a first intersecting plane in a three-dimensional view and in plan.
FIGS. 4c and 4d show the saddle surface of FIG. 3 with a second intersecting plane in a three-dimensional view and in plan.

FIG. 4a shows the saddle surface of FIG. 3 once again. As already explained, this saddle surface is made up of the height points A, B, C and D and is limited, furthermore, by the connecting lines a, b, c, d, r and s.

Specific contour lines of this saddle surface are now to be calculated and represented. A contour line in this case is that line which results when the saddle surface is intersected by a plane of a specific height.

In FIG. 4 this intersecting plane is defined by the points $A_1$, $B_1$, $C_1$ and $D_1$. The intersecting plane is arranged parallel to the x, y plane, and to be precise at a distance of $z_1=70$. The contour lines of the saddle surface with $z_1=70$ are thus to be calculated.

The computer system simplifies this calculation at least in a first step in that it does not calculate the entire contour lines immediately, but first calculates only the intersections of the plane $A_1$, $B_1$, $C_1$, $D_1$ with the connecting lines a, b, c, d of the height points of the saddle surface. This calculation is known and will not be explained further. The result of this calculation are the intersections 17, 5, 18 and 1. As illustrated in FIG. 4, the intersection 17 is obtained from the intersection of the plane $A_1$, $B_1$, $C_1$, $D_1$ with the connecting line b of the height points A and B, the intersection 5 from the intersection of said plane with the connecting line c, the intersection 18 from the intersection of said plane with the connecting line d and the intersection 1 from the intersection of said plane with the connecting line a.

Figure 4B:
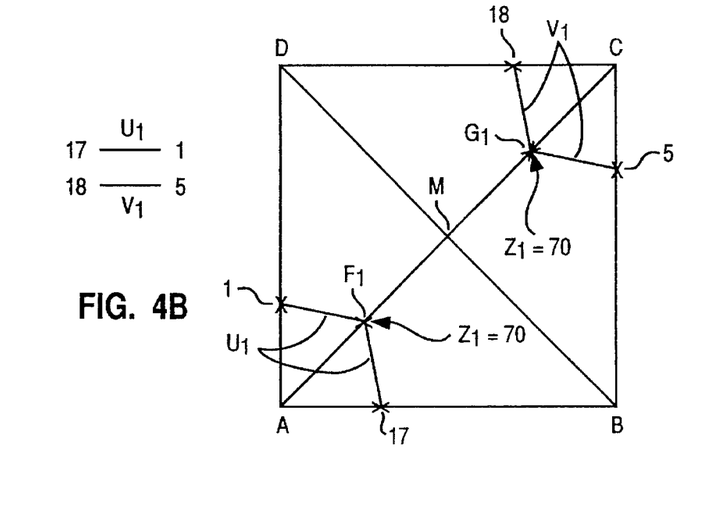

FIG. 4b shows a plan view, in the direction IVb, of the saddle surface illustrated three-dimensionally in FIG. 4a. The height points A, B, C and D of this saddle surface and also the saddle point M are again marked in FIG. 4b. Also shown in FIG. 4b are the intersections 17, 5, 18 and 1 of the saddle surface with the intersecting plane of the height $z_1=70$.

Figure 4C:
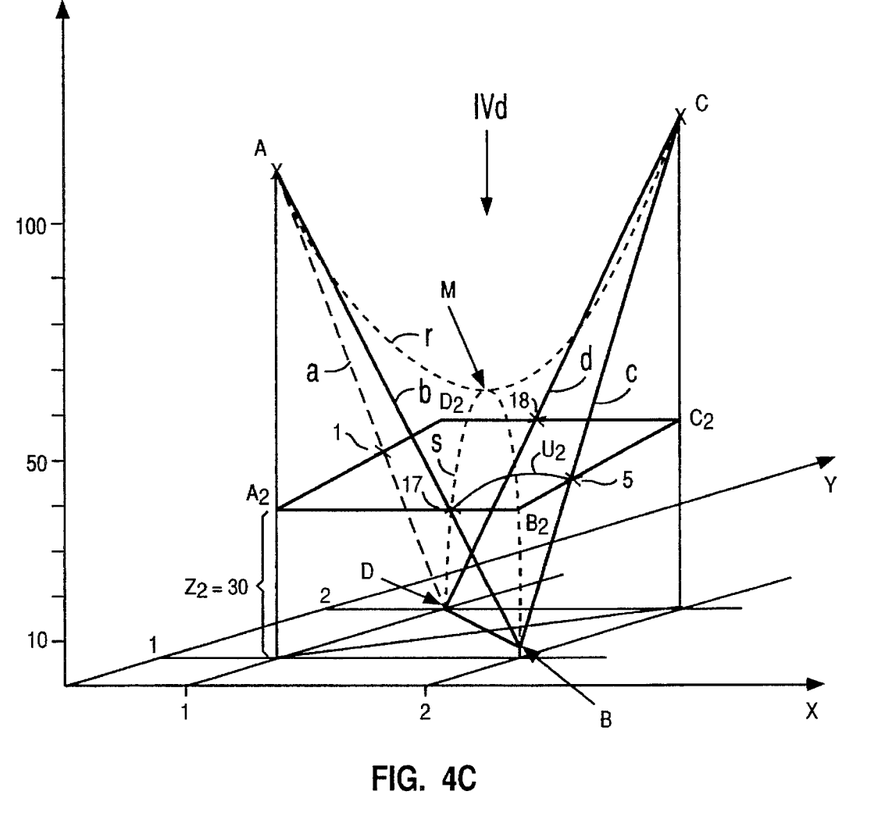

Before the other points and lines in particular of FIG. 4b are explained, the problem facing the computer system when calculating the contour lines of the saddle surface shown shall first be described with reference to FIGS. 4c and 4d. FIG. 4c illustrates, in the same way as FIG. 4a, the saddle surface of FIG. 3 in a three-dimensional view. The plane with which the saddle surface in FIG. 4c is intersected is defined by the points $A_2$, $B_2$, $C_2$, $D_2$. This plane is arranged parallel to the x, y plane as in FIG. 4a, but in contrast to FIG. 4a the plane in FIG. 4c only has a height of $z_2=30$.

As already explained, the computer system is able to calculate in a known manner the intersections of the plane $A_2$, $B_2$, $C_2$, $D_2$ with the connecting lines a, b, c, d of the saddle surface. These intersections are marked in FIGS. 4c and 4d in the same way as in FIGS. 4a and 4b, namely as intersections 17, 5, 18 and 1.

Figure 4D:
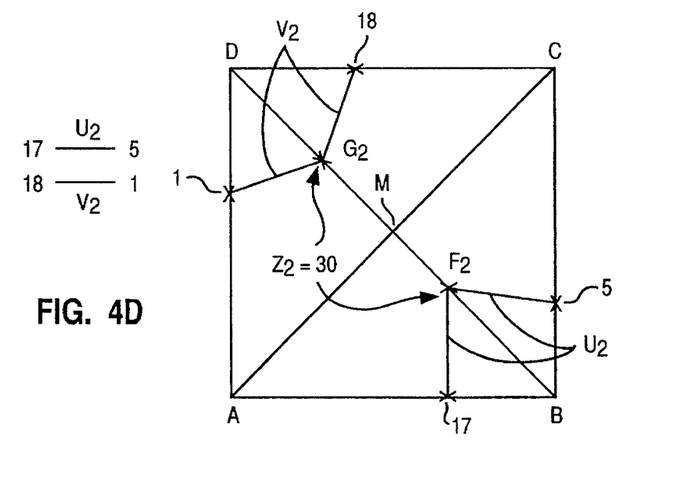

In both cases, that is with an intersecting plane of a height $z_1=70$ as in FIGS. 4a and 4b, and also with an intersecting plane of a height $z_2=30$ as in FIGS. 4c and 4d, the computer system obtains, as the result of its calculations, in each case the four intersections 17, 5, 18, 1 which may well differ in their values in both cases, but exist as such in each case.

From the fact that exactly four intersections exist, the computer system determines that the surface made up of the height points A, B, C and D must be a saddle surface, with the result that these four calculated intersections must be connected to form two contour lines.

This is also evident from FIGS. 4a to 4d. The intersecting plane with $z_1=70$ as in FIG. 4a has the result that only the connecting lines between the intersections 17 and 1 and between the intersections 18 and 5 can be obtained as the contour lines $u_1$ and $v_1$, as is shown in particular in FIG. 4b. In contrast, the intersecting plane with $z_2=30$ as in FIG. 4c has the result that only the connecting lines between the intersections 17 and 5 and between the intersections 18 and 1 can be obtained as the contour lines $u_2$ and $v_2$.

In both cases, that is with $z_1=70$ and $z_2=30$, two contour lines are thus obtained in each case. However, the same contour lines are not obtained, the contour lines $u_1$ and $v_1$ in the first case represent exactly the "opposite" connections of the intersections 17, 5, 18 and 1 to the contour lines $u_2$ and $v_2$ in the second case.

The problem which the computer system has to solve thus consists in connecting the four calculated intersections correctly to form two contour lines. This problem is achieved according the invention by means of the saddle point M, in particular the $z_M$ value, that is the height of the saddle point.

As already explained, the computer system has two possibilities for interconnecting the intersections 17, 5, 18 and 1 to form two contour lines: either, in the case of FIGS. 4a and 4b, the intersections 17 and 1 and the intersections 18 and 5 are interconnected to form the contour lines $u_1$ and $v_1$ or, in the case of FIGS. 4c and 4d, the intersections 17 and 5 and the intersections 18 and 1 are interconnected to form the contour lines $u_2$ and $v_2$. The decision as to which of the contour lines are the correct ones is made by the computer system using the height $z_M$ of the saddle point M.

For this purpose the computer system compares, in the case of FIGS. 4a and 4b, the height $z_M$ of the saddle point M, for example, with the height $z_A$ of the height point A and also with the height $z_1$ of the intersecting plane $A_1$, $B_1$, $C_1$, $D_1$. If the height $z_1$ is situated between the height $z_M$ and the height $z_A$, this signifies that an intersection with the intersecting plane $A_1$, $B_1$, $C_1$, $D_1$ also exists on the connecting line of the height point A and the saddle point M. Since, in the present example $z_A=100$, $z_M=50.25$ and $z_1=70$, this has the result that $z_1$ lies between $z_M$ and $z_A$, and that an intersection with the intersecting plane $A_1$, $B_1$, $C_1$, $D_1$ thus exists on the connecting line of the height point A and the saddle point M. This intersection is marked with $F_1$ in FIG. 4b.

The fact that this intersection $F_1$ exists on the connecting line of the height point A and the saddle point M has the result that the contour line $u_1$ must pass through this intersection $F_1$. This is indicated in FIG. 4b by the fact that the intersection 17 and the intersection $F_1$ and also said intersection $F_1$ and the intersection 1 are interconnected by straight-line segments. The entire connecting line of the intersections 17 and 1 via the intersection $F_1$ is represented by $u_1$.

The contour line $v_1$ can be produced correspondingly by comparing the height $z_M$ with the height $z_C$ of the height point C and with the height $z_1$ of the intersecting plane $A_1$, $B_1$, $C_1$, $D_1$. The contour line $v_1$ in this case consists, as shown in FIG. 4b, of the straight segments between the intersection 18 and the intersection $G_1$ and between said intersection $G_1$ and the intersection 5.

If, however, the comparison described is applied to the height points B or D, no contour line results. The reason for this is that the height $z_1=70$ is not situated between the height $z_M=50.25$ and the height $z_B=3$ and $z_D=1$ of the height points B and D, respectively. This has the result that no intersection exists between the connecting lines of the saddle point M and the height points B and D, respectively, and the intersecting plane $A_1$, $B_1$, $C_1$, $D_1$. Since, therefore, there is no point with the height $z_1=70$ on these connecting lines, it is not possible for any contour line with this height $z_1=70$ to pass through these connecting lines. The contour lines cannot therefore intersect these connecting lines.

By checking whether the height of the intersecting plane lies between the height of the saddle point and the height of one of the height points, the computer system is thus able to decide whether or not a contour line has to pass through the connecting line of the saddle point and this one height point. If the contour line has to intersect this connecting line, the computer system is able to interconnect the two intersections neighbouring this connecting line to form a contour line. If, however, this connecting line cannot be intersected by a contour line, the computer system is able to interconnect those intersections to form two contour lines, of which in each case only one intersection neighbours the connecting line.

A brief graphical explanation of this checking process will now be given with reference to FIG. 4c. By comparing the height $z_M=50.25$ of the saddle point M with the height $z_B=3$ of the height point B and the height $z_2=30$ of the intersecting plane $A_2$, $B_2$, $C_2$, $D_2$, it is shown that the saddle point M is situated above and the height point B below the intersecting plane $A_2$, $B_2$, $C_2$, $D_2$. This has the result that the connecting line of the saddle point M and the height point B is intersected by the intersecting plane $A_2$, $B_2$, $C_2$, $D_2$, and to be precise at the intersection $F_2$ as shown in FIG. 4d. The contour line $u_2$ must therefore pass through this intersection $F_2$ and is represented in FIG. 4d by straight-line segments between the intersection 17 and the intersection $F_2$ and between this intersection $F_2$ and the intersection 5. In contrast, a comparison of the height $z_A=100$ of the height point A with the height $z_M=50.25$ of the saddle point M and the height $z_2=30$ of the intersecting plane $A_2$, $B_2$, $C_2$, $D_2$ shows that the height $z_2$ does not lie between the heights $z_A$ and $z_M$. This has the result that the connecting line of the height point A and the saddle point M cannot be intersected by any contour line.

In this way, the computer system is thus able to calculate for each mesh, that is for each tiny quadrangle of the rectangle net, the two correct contour lines. As a result, by putting together these contour lines the entire contour-line polygons are obtained, it being possible for the latter to be open or closed polygons.

Figure 5A:
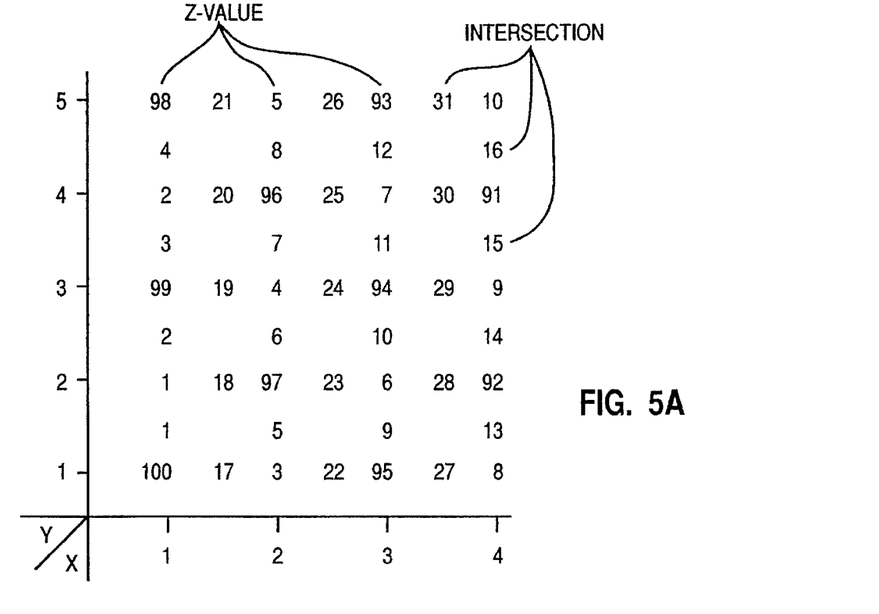
FIGS. 5a and 5b show the table of FIG. 1 with additionally entered numbers of all the intersections and with schematically entered contour lines between the intersections.

In FIG. 5a the table of FIG. 1 is shown again, but with the numbers of all the intersections which result during an intersection of the wave-shaped surface defined by the table of FIG. 1 also being entered in addition to the z values. The sequence of the numbers of the intersections has been chosen at random, starting at the bottom left in the table of FIG. 5a and then numbering consecutively in columns.

Figure 5B:
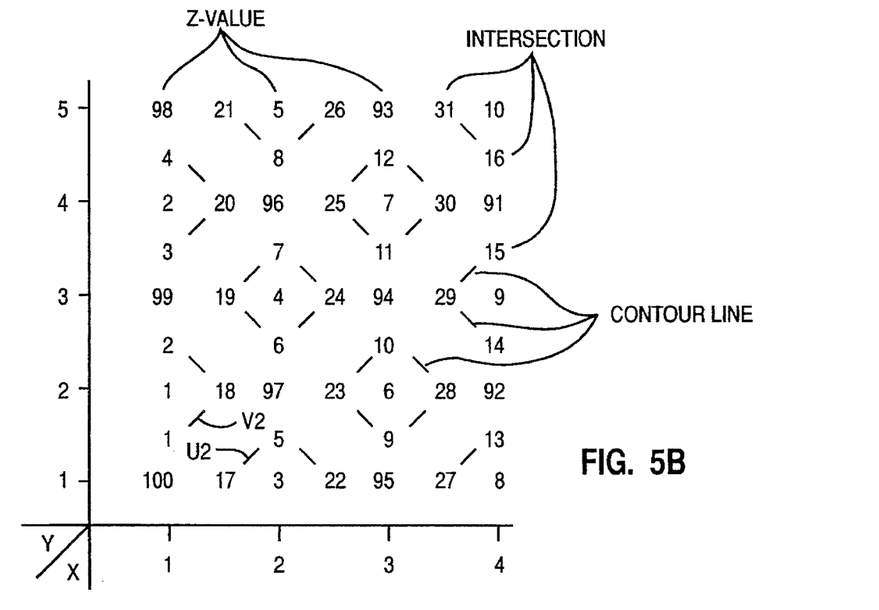

In comparison with FIG. 5a, in FIG. 5b, for the second case shown in FIGS. 4c and 4d, the individual contour lines are additionally entered schematically between the intersections, that is the contour line $u_2$ between the intersections 17 and 5, the contour line $v_2$ between the intersections 18 and 1, etc. In FIG. 5b as a whole, open contour-line polygons, for example from the intersection 1 via the intersection 18 to the intersection 2, and closed contour-line polygons, for example from the intersection 9 via the intersection 28, the intersection 10 and the intersection 23 back again to the intersection 9, are obtained. It can thus be seen from FIG. 5b that in the present second case where the height $z_2=30$ of the intersecting plane is less than the height $z_M=50.25$ of the saddle point M, the contour lines extend in a circle around the "low" height points.

If the height of the intersecting plane were greater than the height of the saddle point M, as it is in the first case shown in FIGS. 4a and 4b, this would result in the contour lines extending in a circle around the "high" height points.

Figure 6A:
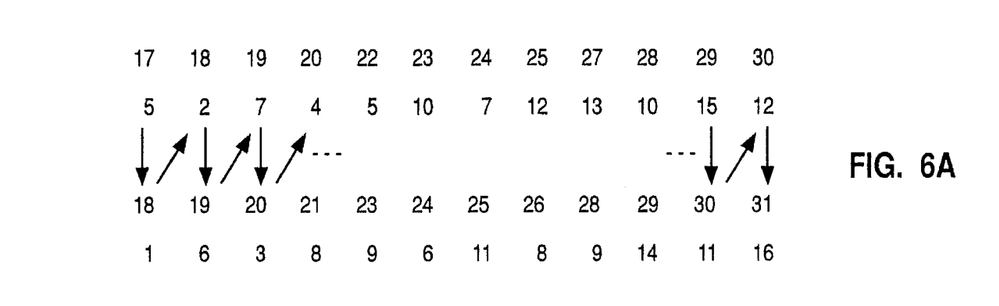
FIGS. 6a to 6c show rearrangements of the number pairs of the intersections belonging together.

FIG. 6a contains all the intersections of the intersecting plane of the second case as shown in FIGS. 4c and 4d with the saddle surface. The intersections are arranged in pairs, two intersections interconnected by a contour line always forming a pair. As a whole, FIG. 6a thus contains, by means of these intersection pairs, all the contour lines represented schematically by connecting lines in FIG. 5b.

The intersection pairs are arranged in FIG. 6a such that in the first two lines the first intersection given is that which in FIG. 5b is situated at the bottom left in the x, y coordinate system; this is the intersection 17. This intersection is assigned, in the first two lines of FIG. 6a, that intersection which in FIG. 5b is situated, via a contour line, above the starting intersection; in this case the intersection 5. Situated thereafter in the first two lines of FIG. 6a is the intersection 18 arranged above the intersection 17 in the same column, together with the associated intersection 2 in turn arranged above the intersection 18. This arrangement of the first two lines of FIG. 6a is continued in accordance with the columns of FIG. 5b, and to be precise until the penultimate intersection 30 in the last column of FIG. 5b, which is assigned the intersection 12 above it. Since the intersection 31 does not have any associated intersection arranged above it, said intersection 31 is not included in the first two lines of FIG. 6a.

The next two lines of FIG. 6a are obtained in a corresponding fashion, except that here it is not the associated intersection arranged above that is selected, but in each case the intersection arranged, via a contour line, below the starting intersection. This is, for example with the intersection 18, the associated intersection 1 arranged below. Since the intersection 17 does not have any associated intersection arranged below it, it is not included in the first two lines of FIG. 6a. The last intersection in these last two lines of FIG. 6a is the intersection 31, which is assigned the associated intersection arranged below it.

Figure 6B:
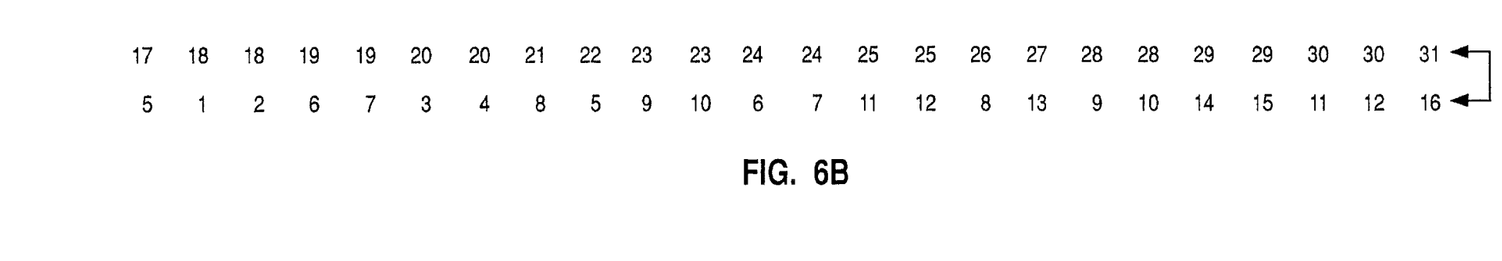

By rearranging the pairs of lines of FIG. 6a, the two lines of FIG. 6b are produced. This is done by starting in FIG. 6b with the first intersection pair 17-5 of the first two lines of FIG. 6a and then adding the likewise first intersection pair 18-1 of the second two lines. The two lines of FIG. 6b are continued with the second intersection pair 18-2 of the first two lines of FIG. 6a, the second intersection pair 19-6 of the second two lines of FIG. 6a, etc. As a whole, therefore, the intersection pairs of the second two lines of FIG. 6a are inserted between the intersection pairs of the first two lines of FIG. 6a. The number of intersection pairs, and also the intersection pairs as such, remain unchanged.

Figure 6C:
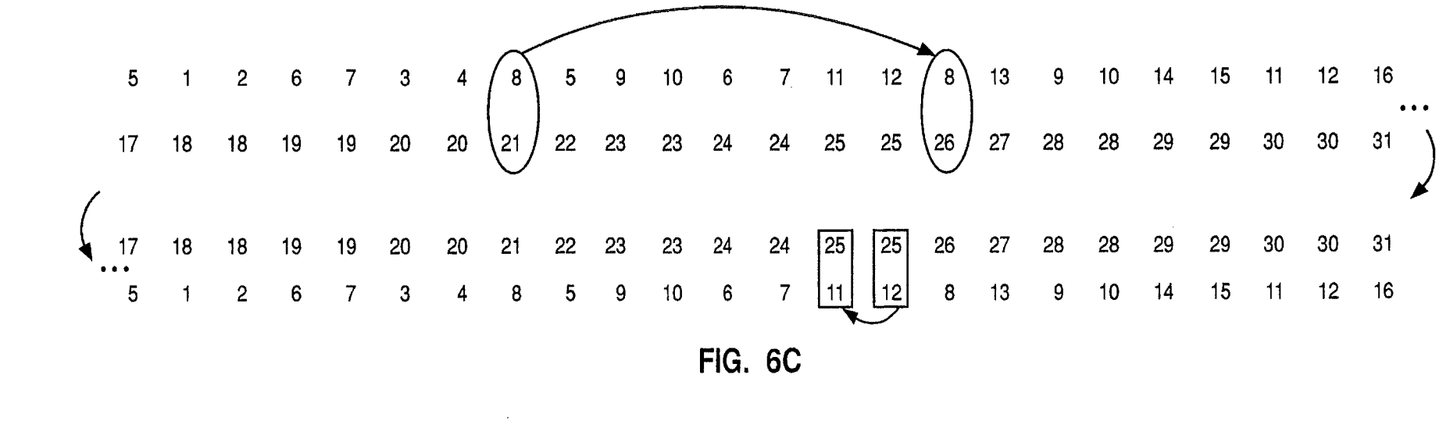

By concatenating and exchanging intersection pairs from the two lines of FIG. 6b, the two lines of FIG. 6c are now produced. For this purpose, the two lines of FIG. 6b are exchanged for one another, so that the line containing the intersections 5, 1, 2, 6, etc. is then located in the upper line. The two unexchanged lines of FIG. 6b are now added to these two exchanged lines of FIG. 6b. This results in twice the number of intersection pairs. As is evident from FIG. 6c, the intersection pairs as such have not, however, changed in this process, apart from the fact that the intersections of these intersection pairs are exchanged in the first half of the two lines of FIG. 6c.

Figure 7:
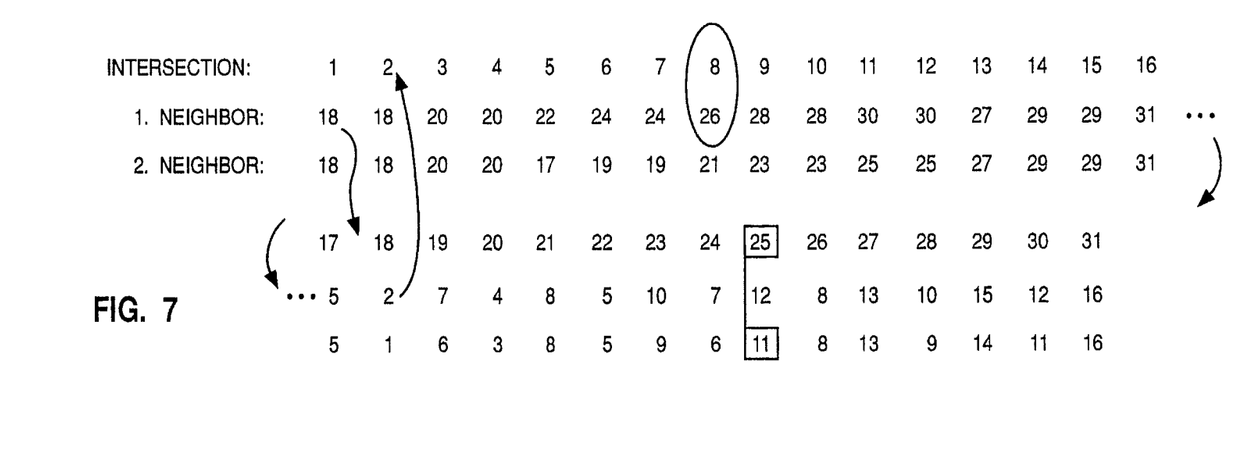
FIG. 7 shows a table with all the intersections and the respectively associated neighbouring intersections.

FIG. 7 shows a table in which all the intersections are listed successively, each of the intersections being assigned the respective associated neighbouring intersections.

The table of FIG. 7 is produced from the two lines of intersection pairs of FIG. 6c by a sorting and, where necessary, overwriting process.

The first neighbour of the intersection 1 is obtained, for example, by searching for the intersection 1 in the top line of the two lines of FIG. 6. This intersection 1 is included in the two lines of FIG. 6c in the second intersection pair, the intersection 1 being assigned the intersection 18. The intersection 1 is not shown anywhere else in the top line of the two lines of FIG. 6. Consequently, as the first neighbour of the intersection 1, the assigned intersection 18 can be entered in the table of FIG. 7. Correspondingly, for the intersection 8 in the two lines of FIG. 6c, the assigned intersection 21 is found if the search is started from the left end of the two lines. If, however, this search is continued in the specified direction, that is from left to right, the intersection 8 is found a second time in the top line of the two lines of FIG. 6c. This second intersection 8 is assigned the intersection 26. In the table of FIG. 7, the assigned intersection 21 which is found first is not entered, but the assigned intersection 26 which is found thereafter is entered as the first neighbour of the intersection 8. The assigned intersection 21 which is found first is thus overwritten.

In this way, for all the intersections 1 to 31 the respective associated first neighbours can be determined from the two lines of FIG. 6c and entered in the table of FIG. 7.

The same procedure can be adopted for determination of the second neighbours, the only exception being that in the overwriting process the search is carried out not from left to right, but from right to left in the two lines of FIG. 6c. Thus, for example, for the intersection 25 the assigned intersection 12 is found first in the two lines of FIG. 6c if the search is carried out from right to left. The continued search shows, however, that the intersection 25 occurs again thereafter in this search direction, the intersection 11 being assigned in this case. For this reason, it is not the intersection 12 found first, but the intersection 11 found thereafter which is entered in the table of FIG. 7 as the second neighbour of the intersection 25.

In this way, for all the intersections 1 to 31 it is also possible to enter the respective second neighbours in the table of FIG. 7 using the two lines of FIG. 6c.

The table of FIG. 7 thus contains neighbourhood relationships between the individual intersections, which can be used to display the contour-line polygons connecting the intersections on the data output device of the computer system.

For this purpose, the computer system starts with the intersection 1 in the table of FIG. 7. This intersection 1 is assigned the intersection 18 as the first and also second neighbour. This means that the intersection 1 is a boundary intersection. The computer system now searches for the intersection 18 in the table of FIG. 7 and obtains as the first neighbour the intersection 2 and as the second neighbour the intersection 1. It is already known from the first-mentioned neighbourhood relationship that the intersection 1 is a neighbour of the intersection 18. For this reason, only the second neighbourhood relationship is now used, so that the intersection 18 possesses the intersection 2 as the further neighbour. When the computer system finally searches for the intersection 2, it discovers that the intersection 2 possesses the intersection 18 as the first and also second neighbour, which in turn means that the intersection 2 is a boundary intersection.

In all, the sequence of intersections 1-18-2 thus results from the table of FIG. 7, the intersections 1 and 2 being boundary intersections. This sequence signifies an open contour-line polygon which leads from the intersection 1 via the intersection 18 to the intersection 2.

Figure 8A:
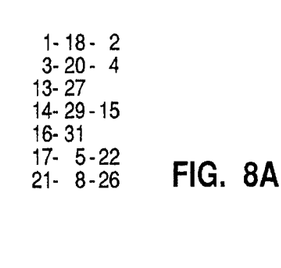
FIGS. 8a and 8b show the number sequences of the intersections of the open and closed contour-line polygons.

This open contour-line polygon 1-18-2 is listed in FIG. 8a. The other open contour-line polygons mentioned there result in a corresponding fashion from the table of FIG. 7, it being possible for these open contour-line polygons to be found in a simple way, owing to the fact that the first and second neighbours are always the same in terms their boundary intersections.

Once all the open polygons have been found, the closed contour-line polygons can then be searched for. The latter can be derived from the table of FIG. 7 in the same way as the open polygons, by starting at any intersection of the closed polygon.

Thus, for example, the intersection 6 in the table of FIG. 7 has the intersection 24 as the first neighbour. The intersection 24 possesses the intersection 7 as the first neighbour. This intersection 7 has the intersection 24, which is already known, as the first neighbour but the intersection 19, which is not yet known, as the second neighbour. The intersection 19 has the intersection 7, which is already known, as the first neighbour and the intersection 6, which is likewise already known, as the second neighbour. In this case, the intersection 6 represents the starting intersection, so that now the polygon is closed. In all, a contour-line polygon with the intersections 6-24-7-19-6 results in this way.

Figure 8B:
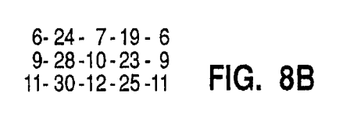

This closed contour-line polygon is listed in FIG. 8b. The other two closed polygons shown in FIG. 8b result from the table of FIG. 7 in a corresponding fashion.

The table of FIG. 7 is expediently stored in the memory of the computer system. Naturally, the table of FIG. 7 can also be stored in another arrangement. What is essential is that for each intersection the associated neighbourhood relationship is contained in the memory. To output the contour-line polygons on the data output device, in particular on an image screen with memory effect, it is then merely necessary to derive the contour-line polygons from these neighbourhood relationships in the manner explained and output them to the data output device.

We claim:

1. A computer implemented method for digitally producing displayable contour lines from a plurality of height points above a polygon net, wherein four selected adjacent height points of the plurality of height points (A, B, C, D) each having a height value ($z_A$, $z_B$, $z_C$, $z_D$) make up a saddle surface (A-B-C-D, r, s) having a saddle point above a quadrangle ($A_0$, $B_0$, $C_0$, $D_0$) of the polygon net (x, y values), and wherein a first and second contour lines ($u_1$, $v_1$ and $u_2$, $v_2$, respectively) are those lines which are obtained by a plane ($A_1$-$B_1$-$C_1$-$D_1$ or $A_2$-$B_2$-$C_2$-$D_2$, respectively) of a given plane height ($z_1$ or $z_2$, respectively) intersecting the saddle surface (A-B-C-D, r, s), comprising the following steps of a) calculating an intersection (17, 5, 18, 1) for each line connecting adjacent pairs of said height points (a, b, c, d), with the plane ($A_1$-$B_1$-$C_1$-$D_1$ or $A_2$-$B_2$-$C_2$-$D_2$, respectively) of the given height ($z_1$ and $z_2$, respectively), b) calculating a saddle point height ($z_M$) of a saddle point (M) positioned above the center of the quadrangle ($A_0$, $B_0$, $C_0$, $D_0$) with said saddle point height being calculated as the mean value of the height values ($z_A$, $z_B$, $z_C$, $z_D$) of the height points (A, B, C, D) of the saddle surface (A-B-C-D, r, s), c) comparing the saddle point height ($z_M$) of the saddle point (M) with the height value ($z_A$) of a selected one of the height points (A, B, C, D) of the saddle surface (A-B-C-D, r, s) and with the given plane height ($z_1$) of the plane ($A_1$-$B_1$-$C_1$-$D_1$) intersecting the saddle surface (A-B-C-D, r, s), d1) and, if the given plane height ($z_1$) lies between the height ($z_M$) of the saddle point (M) and the height value ($z_A$) of the height point (A), determining the first contour line ($u_1$) as a connection between two neighbouring intersections (17, 1) such that the connection intersects the straight line connecting the saddle point (M) and the height point (A);

d2) determining the second contour line ($u_2$ or $v_2$) as a connection between two neighbouring intersections (17, 5 or 18, 1) such that the second contour line does not intersect the connecting line of the saddle point (M)

and the height point (A) if the given height ($z_2$) does not lie between the height ($z_M$) of the saddle point (M) and the height ($z_A$) of the height point (A);

e) calculating a first and a second intersection ($F_1$ or $G_1$ or $F_2$ or $G_2$, respectively) of the connecting line of the saddle point (M) and the height points (A, B, C, D) with the plane ($A_1$-$B_1$-$C_1$-$D_1$ and $A_2$-$B_2$-$C_2$-$D_2$, respectively) of a given height ($z_1$ and $z_2$, respectively), f) and passing the first and second contour lines ($u_1$ or $v_1$ and $u_2$ or $v_2$, respectively) through the first or second intersection ($F_1$ or $G_1$ and $F_2$ or $G_2$, respectively);

g) repeating steps a-d1 for each group of four adjacent height points from said plurality of height points, determining first and second intersections and first and second contour lines for each of said groups, (h) determining based on the first and second contour lines from all of said groups, a first and second neighbor intersection for each of the intersections interconnected by the groups of first and second contour lines;

(i) displaying on a computer display device the contour lines for said height points in accordance with the relationships determined by the neighbouring intersections to form open and closed contour-line polygons.

2. Method according to claim 1, in which the first and second neighbouring intersections are determined by ordering the intersections interconnected by the groups of first and second contour lines and traversing the ordered intersections in a first direction to determine the first neighbor and a second direction, reverse of said first direction, to determine the second neighbor.

3. A computer system for digitally transforming and displaying contour lines from a plurality of height points above a polygon net, wherein four adjacent height points of the plurality of height points (A, B, C, D) each having a height value ($z_A$, $z_B$, $z_C$, $z_D$) make up a saddle surface (A-B-C-D, r, s) having a saddle point above a quadrangle ($A_0$, $B_0$, $C_0$, $D_0$) of the polygon net (x, y values), and wherein a first and second contour lines ($u_1$, $v_1$ and $u_2$, $v_2$, respectively) are those lines which are obtained by a plane ($A_1$-$B_1$-$C_1$-$D_1$ and $A_2$-$B_2$-$C_2$-$D_2$, respectively) of a given plane height ($z_1$ and $z_2$, respectively) intersecting the saddle surface (A-B-C-D, r, s), comprising:

processor means for determining contour lines by a) calculating an intersection (17, 5, 18, 1) for each line connecting adjacent pairs of said height points (a, b, c, d), with the plane ($A_1$-$B_1$-$C_1$-$D_1$ or $A_2$-$B_2$-$C_2$-$D_2$, respectively) of the given height ($z_1$ and $z_2$, respectively), b) calculating a saddle point height ($z_M$) of a saddle point (M) positioned above the center of the quadrangle ($A_0$, $B_0$, $C_0$, $D_0$) with said saddle point height being calculated as the mean value of the height values ($z_A$, $z_B$, $z_C$, $z_D$) of the height points (A, B, C, D) of the saddle surface (A-B-C-D, r, s), c) comparing the saddle point height ($z_M$) of the saddle point (M) with the height value ($z_A$) of a selected one of the height points (A, B, C, D) of the saddle surface (A-B-C-D, r, s) and with the given plane height ($z_1$) of the plane ($A_1$-$B_1$-$C_1$-$D_1$) intersecting the saddle surface (A-B-C-D, r, s), d1) and, if the given plane height ($z_1$) lies between the height ($z_M$) of the saddle point (M) and the height value ($z_A$) of the height point (A), determining the first contour line ($u_1$) as a connection between two neighbouring intersections (17, 1) such that the connection intersects the straight line connecting the saddle point (M) and the height point (A), d2) determining the second contour line ($u_2$ or $v_2$) as a connection between two neighbouring intersections (17, 5 or 18, 1) such that the second contour line does not intersect the connecting line of the saddle point (M) and the height point (A) if the given height ($z_2$) does not lie between the height ($z_M$) of the saddle point (M) and the height ($z_A$) of the height point (A), e) calculating a first and a second intersection ($F_1$ or $G_1$ or $F_2$ or $G_2$, respectively) of the connecting line of the saddle point (M) and the height points (A, B, C, D) with the plane ($A_1$-$B_1$-$C_1$-$D_1$ and $A_2$-$B_2$-$C_2$-$D_2$, respectively) of a given height ($z_1$ and $z_2$, respectively), f) and passing the first and second contour lines ($u_1$ or $v_1$ and $u_2$ or $v_2$, respectively) through the first or second intersection ($F_1$ or $G_1$ and $F_2$ or $G_2$, respectively), (g) repeating steps a-d1 for each group of four adjacent height points from said plurality of height points, determining first and second intersections and first and second contour lines for each of said groups, (h) determining based on the first and second contour lines from all of said groups, a first and second neighbor intersection for each of the intersections interconnected by the groups of first and second contour lines, (i) displaying on a computer display device the contour lines for said height points in accordance with the relationships determined by the neighbouring intersections to form open and closed contour-line polygons, a memory, in which the intersections (1, 2, 3, . . . , 30, 31) and the neighbouring intersections are stored.

* * * * *